(12) United States Patent
Tsuji et al.

(10) Patent No.: US 10,846,030 B2
(45) Date of Patent: Nov. 24, 2020

(54) COMMUNICATION DEVICE AND NON-TRANSITORY COMPUTER-READABLE MEDIUM STORING COMPUTER-READABLE INSTRUCTIONS FOR COMMUNICATION DEVICE OR SERVER

(71) Applicant: BROTHER KOGYO KABUSHIKI KAISHA, Nagoya (JP)

(72) Inventors: Ryoya Tsuji, Nagoya (JP); Takeshi Miyake, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/423,258

(22) Filed: May 28, 2019

(65) Prior Publication Data
US 2019/0361643 A1    Nov. 28, 2019

(30) Foreign Application Priority Data

May 28, 2018   (JP) .................. 2018-101638

(51) Int. Cl.
   *G06F 3/12*       (2006.01)
(52) U.S. Cl.
   CPC .......... *G06F 3/1222* (2013.01); *G06F 3/1231* (2013.01); *G06F 3/1286* (2013.01); *G06F 3/1287* (2013.01)
(58) Field of Classification Search
   CPC .... G06F 3/1222; G06F 3/1287; G06F 3/1286; G06F 3/1231; G06F 21/606; H04N 2201/3235; H04N 1/00244; H04N 1/00204; H04N 2201/0094; H04N 1/00127; H04L 63/14

USPC ....................................................... 358/1.14
See application file for complete search history.

(56) References Cited

U.S. PATENT DOCUMENTS

2005/0120222 A1* 6/2005 Mitsuoka ............. G06F 3/0622
                                                              713/182
2016/0337393 A1   11/2016 Tsuchitoi

FOREIGN PATENT DOCUMENTS

JP         2016-212832 A    12/2016

OTHER PUBLICATIONS

DRAFT Device Provisioning Protocol Technical Specification Version 0.2.11, draft of a standard prepared by the Wi-Fi Alliance, cited in spec on p. 16.

* cited by examiner

*Primary Examiner* — Tammy Paige Goddard
*Assistant Examiner* — Darryl V Dottin
(74) *Attorney, Agent, or Firm* — Scully Scott Murphy and Presser

(57) ABSTRACT

A communication device may receive a target IP address from a target device; after the target IP address which is a global IP address has been received from the target device, send a request signal including the target IP address to a server, the request signal being for causing the server to send a specific signal, the specific signal including the target IP address as a destination IP address; determine whether first information is received from the server, wherein the first information is received from the server in a case where the server receives a response signal including the target IP address as a source IP address in response to the server having sent the specific signal; and in a case where it is determined that the first information is received, execute a security process.

20 Claims, 9 Drawing Sheets

(First Embodiment or Second Embodiment)

(Third Embodiment)

COMMUNICATION DEVICE AND NON-TRANSITORY COMPUTER-READABLE MEDIUM STORING COMPUTER-READABLE INSTRUCTIONS FOR COMMUNICATION DEVICE OR SERVER

CROSS-REFERENCE TO RELATED APPLICATION

This application claims priority to Japanese Patent Application No. 2018-101638 filed on May 28, 2018, the contents of which are hereby incorporated by reference into the present application.

TECHNICAL FIELD

The disclosure herein discloses a technique for executing a process related to security of a target device.

DESCRIPTION OF RELATED ART

An information processing system comprising an MFP and a server is known. The server manages a global IP address that the MFP used to connect to a global network (called an MFP public address below). The MFP determines whether an IP address of the MFP is a private IP address or not. In case of determining that the IP address is not a private IP address, the MFP sends request data to the server and receives response data including the MFP public address from the server. In a case where the IP address of the MFP matches the MFP public address in the response data, the MFP displays an alert indicating that there is a possibility of the MFP being accessed in an unauthorized manner from a device on the Internet since the MFP is open to the Internet.

SUMMARY

In the aforementioned technique, a mechanism for determining whether there is the possibility of the MFP being accessed in an unauthorized manner via the Internet has to be provided in the MFP.

The disclosure herein provides a technique that does not require a target device to be provided with a mechanism for determining whether there is a possibility of the target device being accessed in an unauthorized manner via the Internet.

A non-transitory computer-readable medium storing computer-readable instructions for a communication device is disclosed herein. The computer-readable instructions, when executed by a processor of the communication device, may cause the communication device to: receive a target IP address from a target device different from the communication device, the target IP address being an IP address of the target device; after the target IP address which is a global IP address has been received from the target device, send a request signal including the target IP address to a server via the Internet, the request signal being for causing the server to send a specific signal via the Internet without receiving a signal from the target device, the specific signal including the target IP address as a destination IP address; after the request signal has been sent to the server, determine whether first information is received from the server via the Internet, wherein the first information is received from the server in a case where the server receives a response signal including the target IP address as a source IP address in response to the server having sent the specific signal, and the first information is not received from the server in a case where the server does not receive the response signal in response to the server having sent the specific signal; and in a case where it is determined that the first information is received, execute a security process related to security of the target device, wherein in a case where it is determined that the first information is not received, the security process is not executed.

Moreover, a non-transitory computer-readable medium storing computer-readable instructions for a server is disclosed herein. The computer-readable instructions, when executed by a processor of the server, may cause the server to: receive a request signal from a communication device via the Internet, the request signal including a target IP address which is an IP address of a target device different from the communication device and target identification information for identifying the target device; in a case where the request signal is received from the communication device, send a specific signal via the Internet without receiving a signal from the target device, the specific signal including the target IP address as a destination IP address; determine whether a response signal including the target IP address as a source IP address is received in response to sending the specific signal; in a case where it is determined that the response signal is received, determine whether source identification information included in the response signal matches the target identification information in the request signal; and in a case where it is determined that the response signal is received and it is determined that the source identification information matches the target identification information, send specific information to the communication device via the Internet, the specific information being for causing the communication device to execute a security process related to security of the target device, wherein in a case where it is determined that the response signal is not received, the specific information is not sent, and in a case where it is determined that the source identification information does not match the target identification information, the specific information is not sent.

The above communication device itself and a method carried out by the communication device are also novel and useful. Moreover, the above server itself and a method carried out by the server are also novel and useful. Moreover, a communication system comprising the above communication device and another device (e.g., the target device, the server) is also novel and useful.

EMBODIMENTS

Figure 1:
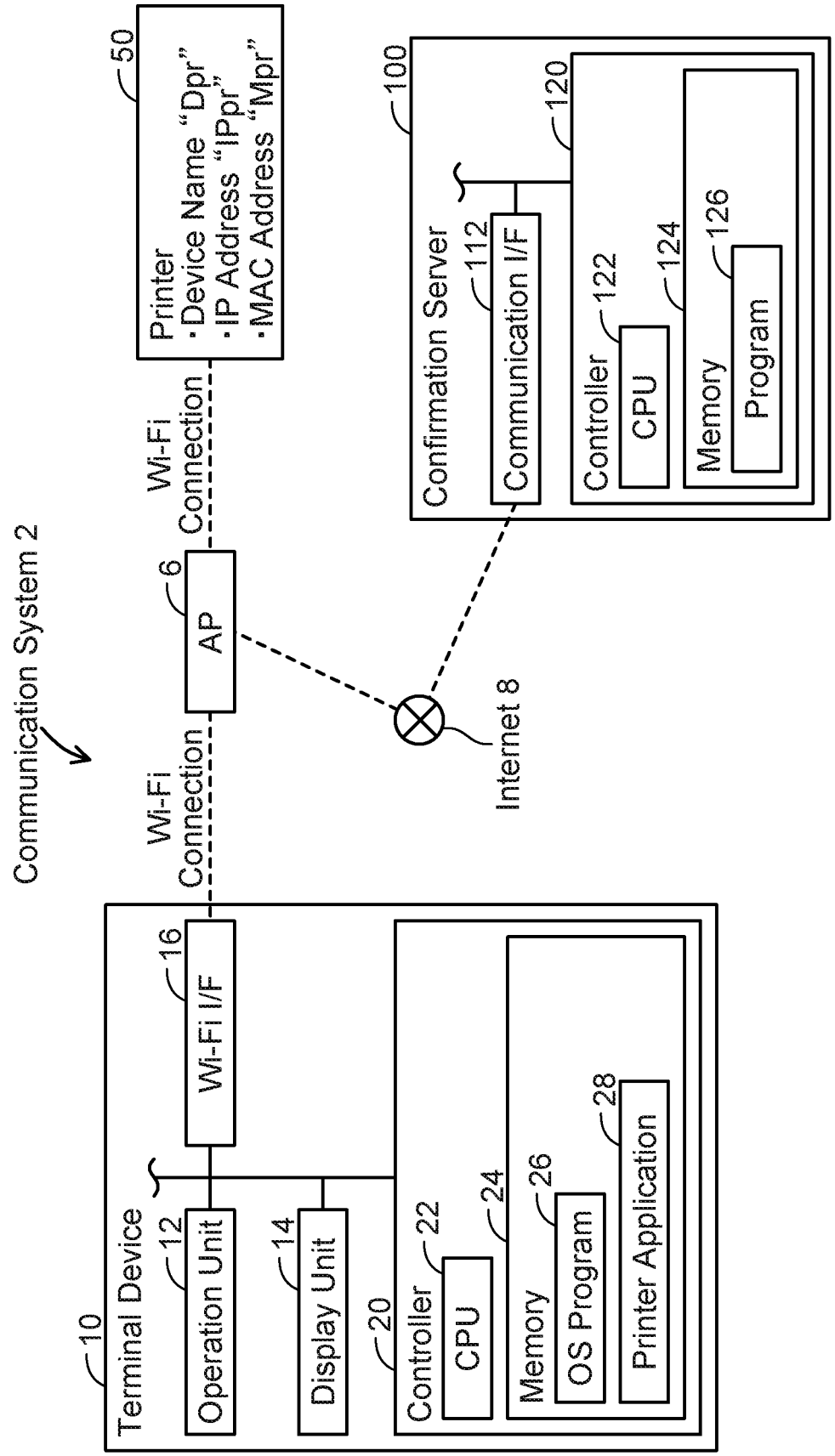
FIG. 1 shows a configuration of a communication system.

First Embodiment (Configuration of Communication System 2; FIG. 1)
As shown in FIG. 1, a communication system 2 comprises a terminal device 10, a printer 50 and a confirmation server 100. Each of the terminal device 10 and the printer 50 is establishing a connection according to a Wi-Fi scheme (called "Wi-Fi connection" below) with a same AP 6, and they are capable of communicating with each other via the AP 6. In a variant, the terminal device 10 and the printer 50 may be capable of communicating with each other by using a wired connection. Moreover, the AP 6 is connected to the Internet 8. Consequently, each of the terminal device 10 and the printer 50 is capable of communicating with the confirmation server 100 on the Internet 8 via the AP 6.

(Configuration of Terminal Device 10)

The terminal device 10 may be a stationary device or a portable device. The portable device includes, for example, a mobile phone, a smartphone, a PDA, a notebook PC, a tablet PC, etc. The terminal device 10 comprises an operation unit 12, a display unit 14, a Wi-Fi interface (below, interface will be denoted "I/F") 16, and a controller 20.

The operation unit 12 comprises a plurality of keys. A user can input various instructions to the terminal device 10 by operating the operation unit 12. The display unit 14 is a display for displaying various types of information. The display unit 14 functions as a so-called touch panel. That is, the display unit 14 also functions as an operation unit.

The Wi-Fi I/F 16 is an I/F for executing wireless communication according to the Wi-Fi scheme (called "Wi-Fi communication" below). The Wi-Fi scheme is a scheme based on, for example, standard 802.11 of IEEE (abbreviation of The Institute of Electrical and Electronics Engineers, Inc.) and includes, for example, 802.11a, 11b, 11g, 11n, 11ac, etc.

The controller 20 comprises a CPU 22 and a memory 24. The memory 24 is constituted of a volatile memory, a non-volatile memory, and the like. The CPU 22 is configured to execute various processes in accordance with programs 26, 28 stored in the memory 24. The OS (abbreviation of Operating System) program 26 is a program for controlling various basic operations of the terminal device 10. The printer application (simplified as "app" below) 28 is an application provided by a vendor of the printer 50 and is installed in the terminal device 10 from, for example, a server on the Internet. The app 28 is an application for registering information of the printer 50 and causing the printer 50 to execute printing. Moreover, in the present embodiment, the app 28 is configured to execute a process related to security of the printer 50.

(Configuration of Printer 50)

The printer 50 is a peripheral device (e.g., a peripheral device of the terminal device 10) capable of executing a print function. A device name "Dpr", which is information for identifying the printer 50, is assigned to the printer 50. Moreover, the printer 50 has an IP address "IPpr" and a MAC address "Mpr".

A private IP address or a global IP address is assigned as the IP address "IPpr". A global IP address is necessary for communication via the Internet 8. Thus, in a case where the IP address "IPpr" is a private IP address, the printer 50 is not accessed in an unauthorized manner via the Internet 8. On the other hand, in a case where the IP address "IPpr" is a global IP address, a signal including the IP address "IPpr" as its destination IP address may be sent from a device on the Internet 8. In this case, if a firewall function of the AP 6 is enabled, the signal is not received by the printer 50, and consequently an unauthorized access to the printer 50 does not occur. However, if the firewall function of the AP 6 is not enabled, the signal may be received by the printer 50. That is, an unauthorized access to the printer 50 may occur. In the present embodiment, the app 28 of the terminal device 10 determines whether there is a possibility of an unauthorized access to the printer 50, which suppresses the unauthorized access.

(Configuration of Confirmation Server 100)

The confirmation server 100 is a server configured to confirm whether the printer 50 can be accessed via the Internet 8. The confirmation server 100 is provided on the Internet 8 by the vendor of the printer 50.

The confirmation server 100 comprises a communication I/F 112 and a controller 120. The communication I/F 112 is connected to the Internet 8. The controller 120 comprises a CPU 122 and a memory 124. The memory 124 is constituted of a volatile memory, a non-volatile memory, and the like. The CPU 122 is configured to execute various processes in accordance with a program 126 stored in the memory 124.

Figure 2:
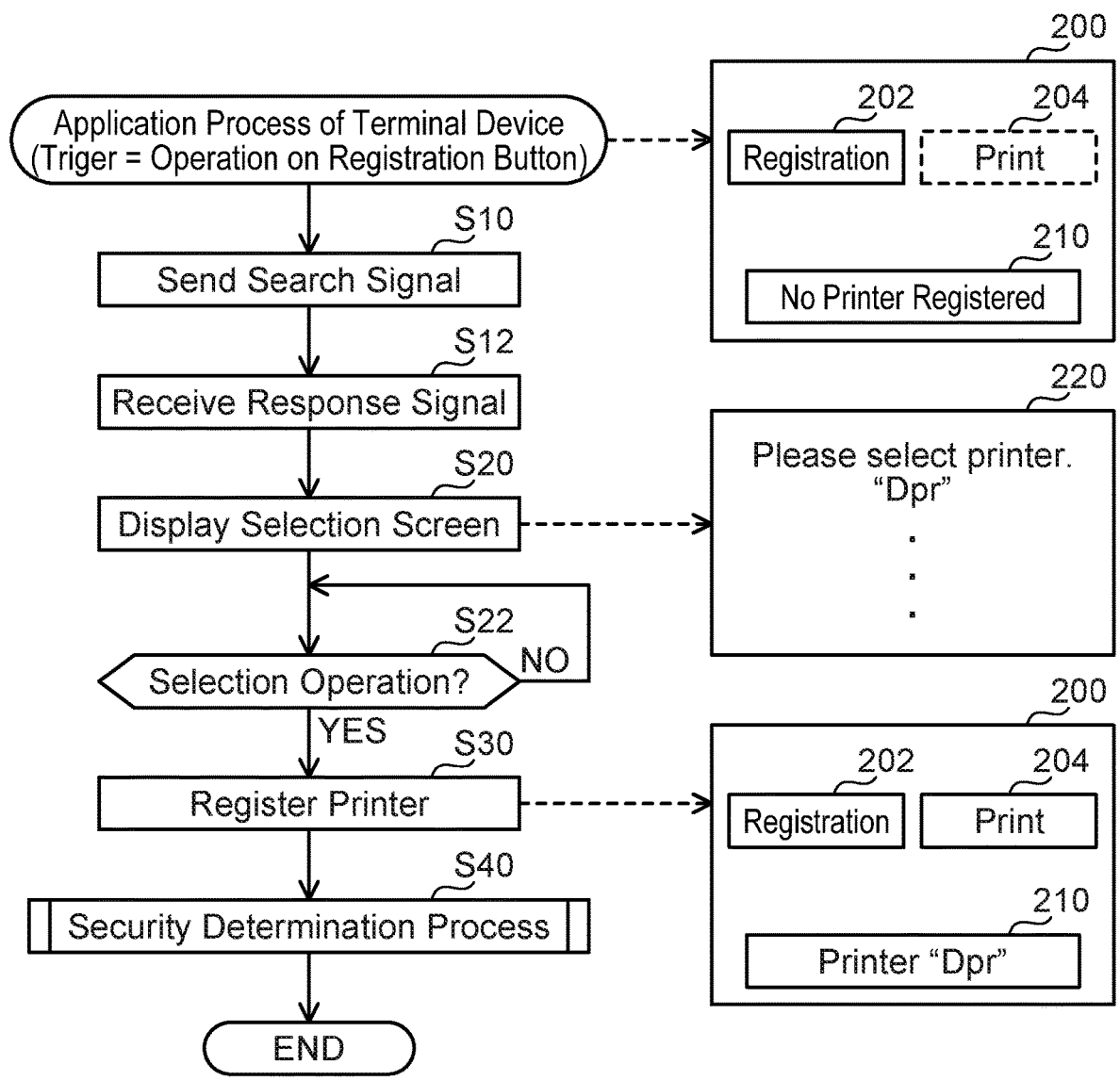
FIG. 2 shows a flowchart of an application process.

(Application Process: FIG. 2)

Next, a process executed by the CPU 22 of the terminal device 10 in accordance with the app 28 will be described with reference to FIG. 2. The process of FIG. 2 is started in a situation where a Wi-Fi connection is established between the terminal device 10 and the AP 6.

In a case where an operation for activating the app 28 is performed by the user, the CPU 22 displays a home screen 200 on the display unit 14. The home screen 200 includes a registration button 202 for registering printer information in the memory 24 (i.e., in the app 28), a print button 204 for causing a registered printer to execute printing, and a display area 210 for displaying a device name of a registered printer. Here, a situation is assumed in which printer information has not been registered yet, thus the print button 204 is displayed in an unselectable state and the display area 210 does not display any printer information therein. When an operation of selecting the registration button 202 is accepted, the CPU 22 starts the process of FIG. 2.

In S10, the CPU 22 broadcasts a search signal, which is for searching for a printer, to the AP 6 by using the Wi-Fi I/F 16 without intermediation of the Internet 8. Thereby, the search signal is received by each of one or more printers connected to the AP 6.

In S12, the CPU 22 receives response signals respectively from the one or more printers by using the Wi-Fi I/F 16 without intermediation of the Internet 8. Each of the response signals includes a device name, an IP address, and a MAC address of the source printer.

In S20, the CPU 22 displays, on the display unit 14, a selection screen 220 that includes the one or more device names included in the one or more response signals received in S12.

In S22, the CPU 22 monitors whether an operation of selecting a device name in the selection screen 220 is accepted. In a case where the operation of selecting a device name is accepted, the CPU 22 determines YES in S22 and proceeds to S30. Below, a situation in which the device name "Dpr" of the printer 50 is selected will be described as an example.

In S30, the CPU registers in the memory 24 (i.e., in the app 28) information of the printer 50 selected in S22. The information of the printer 50 includes the device name "Dpr" selected in S22, the IP address "IPpr" included in the response signal received from the printer 50 in S12, and the MAC address "Mpr" included in the response signal.

Upon executing S30, the CPU 22 displays, on the display unit 14, the home screen 200 that includes the print button 204 in a selectable state and the display area 210 including the device name "Dpr" of the printer 50. Thereby, in a case where an operation of selecting the print button 204 is accepted, the CPU 22 can send print data representing an image to be printed to the printer 50 by using the Wi-Fi I/F 16, with the registered IP address "IPpr" as its destination. As a result, the printer 50 can be caused to execute printing of the image.

Figure 3:
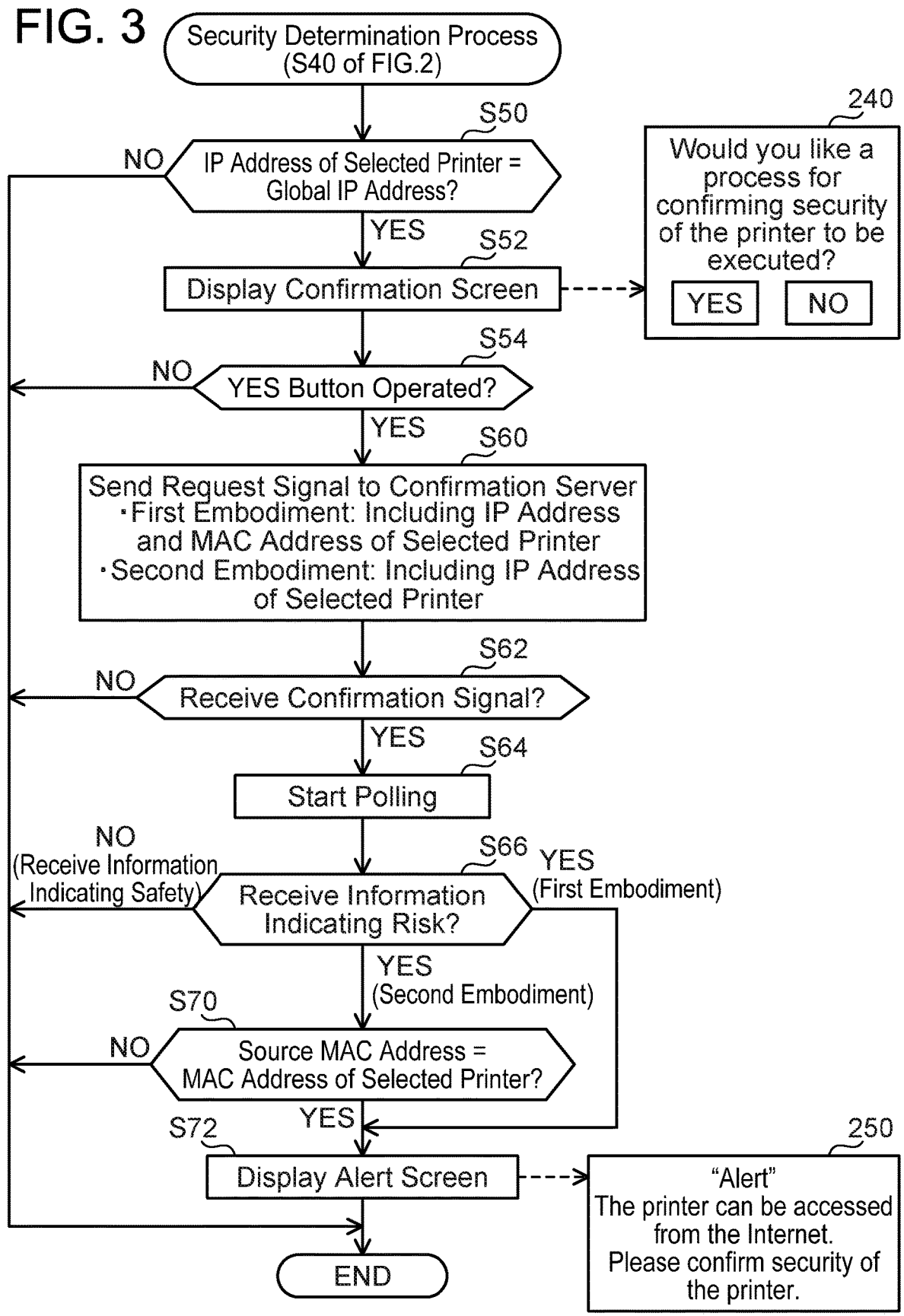
FIG. 3 shows a flowchart of a security determination process.

In S40, the CPU 22 executes a security determination process (see FIG. 3). This is a process for determining whether there is a possibility of the printer 50 being accessed in an unauthorized manner via the Internet 8. The user is highly likely to perform an operation for registering the information of the printer 50 in the terminal device 10 (i.e., operation on the registration button 202, etc) immediately after the printer 50 is purchased and connected to the AP 6. Therefore, if the security determination process is executed when the information of the printer 50 is registered in the terminal device 10, the security determination process can be executed immediately after the printer 50 is connected to the AP 6. Thereby, a state in which an unauthorized access to the printer 50 may occur can be suppressed from continuing for a long time. When S40 completes, the process of FIG. 2 ends.

(Security Determination Process; FIG. 3)

Next, contents of the security determination process of S40 in FIG. 2 will be described with reference to FIG. 3. In S50, the CPU 22 determines whether the IP address "IPpr" of the printer 50 (i.e., the IP address registered in S30 of FIG. 2) is a global IP address (which may be called "GIP" below). GIPs are classified into class A to class C by JPNIC (Japan Network Information Center), which is an organization that manages GIPs. Ranges of GIPs in class A are "1.0.0.0 to 9.255.255.255" and "11.0.0.0 to 126.255.255.255", ranges of GIPs in class B are "128.0.0.0 to 172.15.255.255" and "172.32.0.0 to 191.255.255.255", and ranges of GIPs in class C are "192.0.0.0 to 192.167.255.255" and "192.169.0.0 to 223.255.255.255". In a case where the IP address "IPpr" is an address in the aforementioned ranges of GIPs, the CPU 22 determines that the IP address "IPpr" is a GIP (YES in S50) and proceeds to S52. On the other hand, in a case where the IP address "IPpr" is not an address in the aforementioned ranges of GIPs, the CPU 22 determines that the IP address "IPpr" is not a GIP (i.e., determines that the IP address "IPpr" is a private IP address) (NO in S50), skips processes from S52 onward, and ends the process of FIG. 3. Since an unauthorized access to the printer 50 cannot occur in the case where the IP address "IPpr" is a private IP address, the processes from S52 onward are not executed. Thereby, processing load can be reduced.

In S52, the CPU 22 displays a confirmation screen 240 on the display unit 14. The confirmation screen 240 is a screen for asking the user whether to execute a process of confirming security of the printer 50.

In S54, the CPU 22 determines whether an operation of selecting a YES button in the confirmation screen 240 is performed. The CPU 22 determines YES in S54 and proceeds to S60 in a case where the operation of selecting the YES button is performed in the confirmation screen 240. On the other hand, the CPU 22 determines NO in S54, skips the subsequent processes, and ends the process of FIG. 3 in a case where an operation of selecting a NO button is performed in the confirmation screen 240.

In S60, the CPU 22 sends a request signal including the IP address "IPpr" and the MAC address "Mpr" of the printer 50 (i.e., the IP address and MAC address registered in S30 of FIG. 2) to the confirmation server 100 via the Internet 8 by using the Wi-Fi I/F 16. The request signal is a signal for causing the confirmation server 100 to send a PING signal including the IP address "IPpr" as its destination IP address via the Internet 8 without receiving a signal from the printer 50.

In S62, the CPU 22 determines whether a confirmation signal has been received from the confirmation server 100 via the Internet 8 by using the Wi-Fi I/F 16. The confirmation signal is a signal indicating that the confirmation server 100 has received the request signal. The CPU 22 proceeds to S64 in a case of determining that the confirmation signal has been received from the confirmation server 100 (YES in S62), whereas the CPU 22 skips the subsequent processes and ends the process of FIG. 3 in a case of determining that the confirmation signal is not received from the confirmation server 100 (NO in S62). The confirmation signal may not be received, for example, in a situation where the terminal device 10 is not capable of executing communication via the Internet 8, in a situation where a problem occurs in the confirmation server 100, etc.

In S64, the CPU 22 sends a polling signal to the confirmation server 100 via the Internet 8 by using the Wi-Fi I/F 16. The CPU 22 sends the polling signal periodically. Thereby, the confirmation server 100 can send information (see S66 to be described later) as a response signal to the polling signal to the terminal device 10 over the firewall of the AP 6.

In S66, the CPU 22 determines whether information indicating risk has been received from the confirmation server 100 via the Internet 8 by using the Wi-Fi I/F 16. In a case where the response signal is received by the confirmation server 100 in response to the PING signal having been sent from the confirmation server 100, the information indicating risk is received from the confirmation server 100. More specifically, the information indicating risk is received from the confirmation server 100 in a case where the response signal is received by the confirmation server 100 and a source MAC address included in the response signal matches the MAC address "Mpr" of the printer 50. On the other hand, information indicating safety is received from the confirmation server 100 in a case where the response signal is not received by the confirmation server 100. Moreover, the information indicating safety is received from the confirmation server 100 also in a case where the response signal is received by the confirmation server 100 and the source MAC address included in the response signal does not match the MAC address "Mpr" of the printer 50. The CPU 22 determines YES in S66 and proceeds to S72 in the case of receiving the information indicating risk from the confirmation server 100, whereas the CPU 22 determines NO in S66, skips the subsequent processes and ends the process of FIG. 3 in the case of receiving the information indicating safety from the confirmation server 100.

In S72, the CPU 22 displays an alert screen 250 on the display unit 14. The alert screen 250 includes a message indicating that the printer 50 can be accessed from the Internet 8 and a message indicating that the security of the printer 50 should be confirmed. When the process of S72 completes, the process of FIG. 3 ends.

Figure 4:
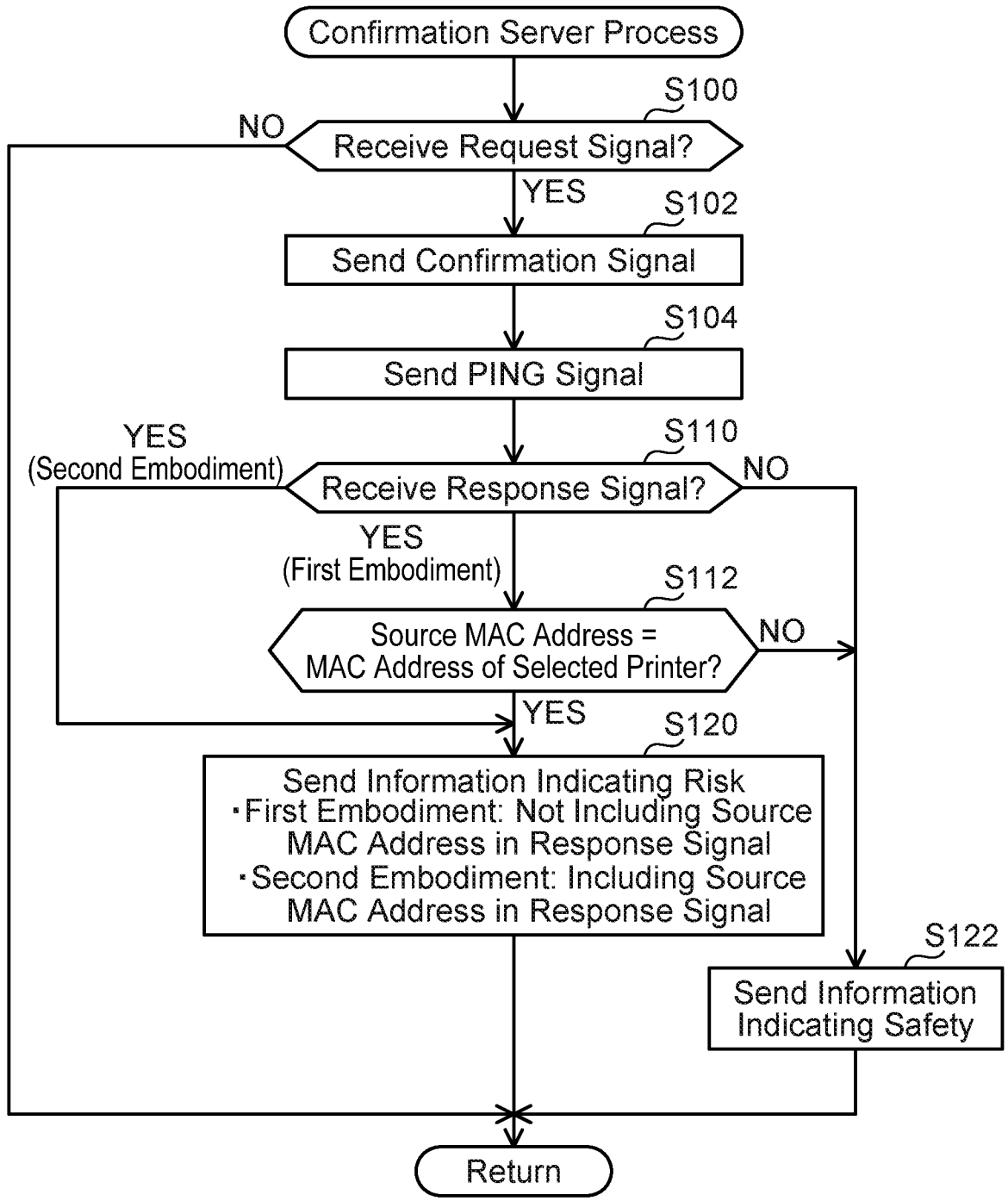
FIG. 4 shows a flowchart of a confirmation server process.

(Confirmation Server Process; FIG. 4)

Next, a process executed by the CPU 122 of the confirmation server 100 in accordance with the program 126 will be described with reference to FIG. 4.

The CPU 122 monitors whether the request signal is received from the terminal device 10 via the Internet 8 by using the communication I/F 112 (see S60 of FIG. 3). In a case of receiving the request signal from the terminal device 10, the CPU 122 determines YES in S100 and proceeds to S102.

In S102, the CPU 122 sends to the terminal device 10 the confirmation signal as a response signal to the request signal via the Internet 8 by using the communication I/F 112 (see S62).

In S104, the CPU 122 sends, via the Internet 8 by using the communication I/F 112, the PING signal that includes the IP address "IPpr" of the printer 50 included in the request signal as its destination IP address.

In S110, the CPU 122 determines whether a response signal to the PING signal has been received via the Internet 8 by using the communication I/F 112. Here, reception of the response signal means that there is the possibility of an unauthorized access to the printer 50. The CPU 122 proceeds to S112 in a case of determining that the response signal has been received (YES in S110), whereas the CPU 122 proceeds to S122 in a case of determining that the response signal is not received (NO in S110).

In S112, the CPU 122 determines whether the source MAC address included in the response signal matches the MAC address "Mpr" of the printer 50 included in the request signal. For example, there may be a case where a same global IP address is assigned to both the printer 50 and another device. In this case, a source device of the response signal received in S110 may be the other device that is different from the printer 50. In order to determine whether the source device of the response signal is the printer 50, whether the source MAC address matches the MAC address "Mpr" is determined in S112. Thereby, in a case where the source device of the response signal is the other device, that is, in a case where there is no possibility of an unauthorized access to the printer 50, the alert screen (S72 of FIG. 3) does not have to be displayed on the terminal device 10. In a case of determining that the source MAC address matches the MAC address "Mpr" (YES in S112), that is, in a case of determining that the source device of the response signal is the printer 50, the CPU 122 proceeds to S120. In a case of determining that the source MAC address does not match the MAC address "Mpr" (NO in S112), that is, in a case of determining that the source device of the response signal is not the printer 50, the CPU 122 proceeds to S122.

As described above, in S64 of FIG. 3, the polling signal is sent from the terminal device 10 to the confirmation server 100. Although not shown in FIG. 4, the CPU 122 receives the polling signal. Then, in S120, the CPU 122 sends to the terminal device 10 the information indicating risk as a response signal to the polling signal via the Internet 8 by using the communication I/F 112 (see YES in S66 of FIG. 3). Thereby, the alert screen can be displayed on the terminal device 10 (see S72).

In S122, the CPU 122 sends to the terminal device 10 the information indicating safety as a response signal to the polling signal via the Internet 8 by using the communication I/F 112 (see NO in S66 of FIG. 3). When S120 or S122 completes, the CPU 22 returns to S100.

Figure 5:
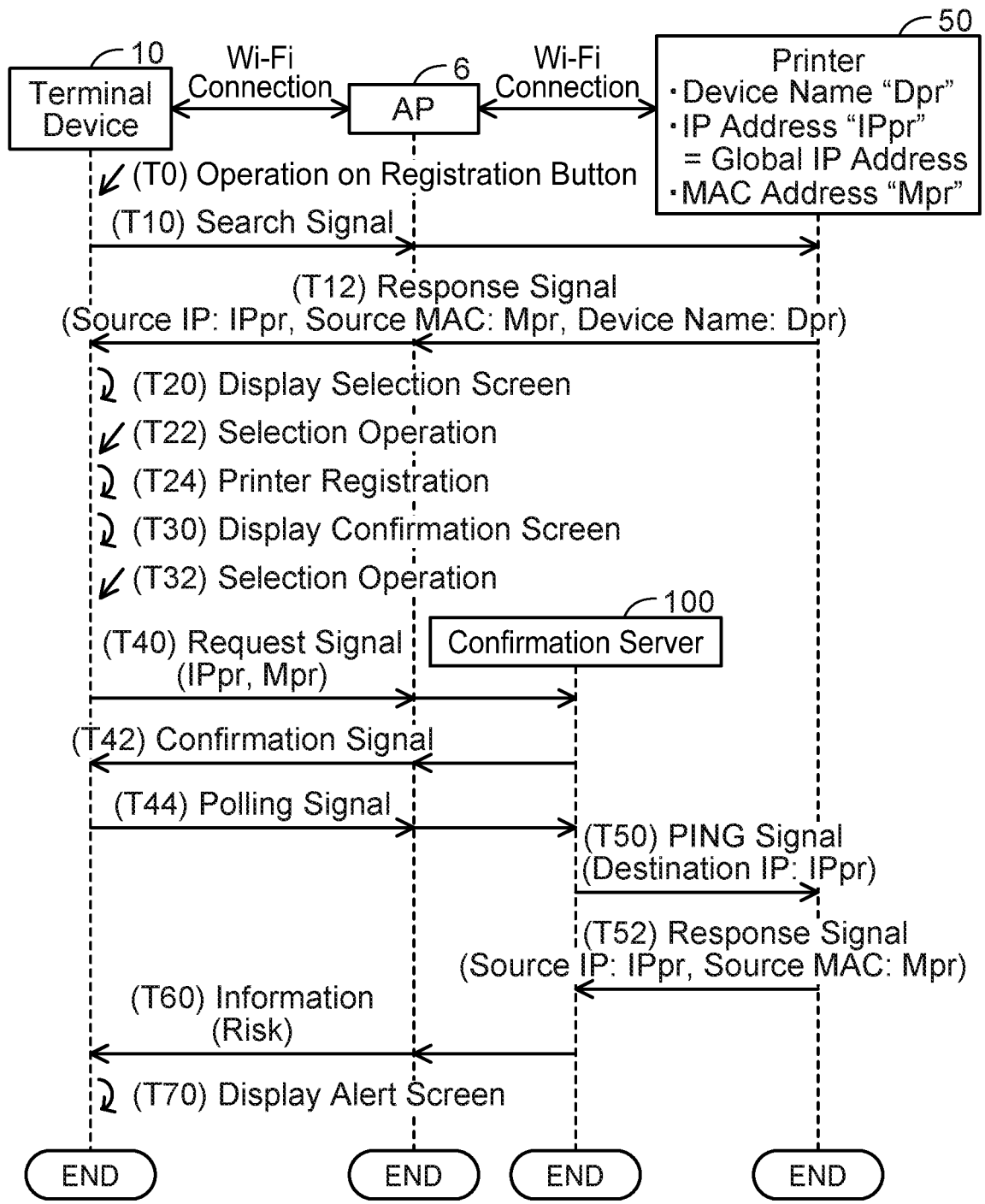
FIG. 5 shows a sequence diagram of a first embodiment.

(Specific Case; FIG. 5)

Next, a specific case realized by the processes of FIG. 2 to FIG. 4 will be described with reference to FIG. 5. In the present case, the IP address "IPpr", which is a global IP address, is assigned to the printer 50. Moreover, the firewall function of the AP 6 is disabled.

In a case where the operation of selecting the registration button 202 in the home screen 200 is accepted in T0 (the trigger of the process of FIG. 2), the terminal device 10 sends a search signal to the printer 50 via the AP 6 in T10 (S10) and receives a response signal from the printer 50 via the AP 6 in T12 (S12). The response signal includes the device name "Dpr", the IP address "IPpr", and the MAC address "Mpr" of the printer 50.

The terminal device 10 displays the selection screen 220 including the device name "Dpr" in T20 (S20) and accepts the operation of selecting the device name "Dpr" in T22 (YES in S22). In this case, in T24, the terminal device 10 registers the information of the printer 50 (S30).

The terminal device 10 determines that the IP address "IPpr" is a global IP address (YES in S50 of FIG. 3) and displays the confirmation screen 240 in T30 (S52). In a case where the operation of selecting the YES button in the confirmation screen 240 is accepted in T32 (YES in S54), the terminal device 10 sends a request signal including the IP address "IPpr" and the MAC address "Mpr" to the confirmation server 100 via the AP 6 and the Internet 8 in T40 (S60, YES in S100 of FIG. 4). In T42, the terminal device 10 receives a confirmation signal from the confirmation server 100 via the AP 6 and the Internet 8 (YES in S62, S102). In this case, in T44, the terminal device 10 starts sending a polling signal (S64).

In T50, the confirmation server 100 sends a PING signal including the IP address "IPpr" as its destination IP address to the printer 50 via the Internet 8 (S104). Since the firewall function of the AP 6 is disabled in the present case, the PING signal is received by the printer 50. Due to this, in T52, the confirmation server 100 receives, from the printer 50 via the Internet 8, a response signal that includes the IP address "IPpr" as it source IP address and further includes the MAC address "Mpr" as its source MAC address (YES in S110).

The confirmation server 100 determines that the source MAC address "Mpr" included in the response signal matches the MAC address "Mpr" included in the request signal (YES in S112) and sends the information indicating risk to the terminal device 10 via the Internet 8 in T60 (S120).

Upon receiving the information indicating risk from the confirmation server 100 via the AP 6 and the Internet 8 in T60 (YES in S66), the terminal device 10 displays the alert screen in T70. Thereby, the user can be informed that the printer 50 may be accessed in an unauthorized manner via the Internet 8. For this reason, the user can change the IP address of the printer 50 from the global IP address to a private IP address and/or can enable the firewall function of the AP 6, for example. Moreover, the user can change a communication setting of the printer 50 (e.g., disable a communication port) to realize a state where an unauthorized access to the printer 50 does not occur, for example.

(Effect of Present Embodiment)

According to the present embodiment, after receiving the IP address "IPpr", which is a global IP address, from the printer 50 (i.e., after T12), the terminal device 10 sends the request signal including the IP address "IPpr" and the MAC address "Mpr" to the confirmation server 100 (T140). Thereby, the confirmation server 100 sends the PING signal including the IP address "IPpr" as the destination IP address via the Internet 8 (T50), determines whether the response signal has been received, and further determines whether the MAC address "Mpr" included in the request signal matches the MAC address "Mpr" included in the response signal. Thereby, the confirmation server 100 can determine whether there is the possibility of the printer 50 being accessed in an unauthenticated manner via the Internet 8. Then, in a case where the confirmation server 100 determines that the response signal has been received (T52) and determines that the MAC address "Mpr" included in the request signal matches the MAC address "Mpr" included in the response signal, that is, in the case where the confirmation server 100 determines that there is the possibility of the printer 50 being accessed in an unauthorized manner via the Internet 8, the confirmation server 100 sends the information indicating risk to the terminal device 10 (T60). Meanwhile, the terminal device 10 determines whether the information indicating risk has been received from the confirmation server 100. Thereby, the terminal device 10 can determine whether there is the possibility of the printer 50 being accessed in an unauthorized manner via the Internet 8. Consequently, a mechanism for executing the determination does not have to be provided in the printer 50. Therefore, the configuration of the printer 50 can be simplified. In the case where the terminal device 10 determines that the information indicating risk has been received from the confirmation server 100 (T60), that is, in the case where the terminal device 10 determines that there is the possibility of the printer 50 being accessed in an unauthenticated manner via the Internet 8, the terminal device 10 displays the alert screen (T70). Thereby, it is possible to prevent the printer 50 from being accessed in an unauthorized manner via the Internet 8.

(Correspondence Relationships)

The terminal device 10, the printer 50, and the confirmation server 100 are examples of "communication device", "target device", and "server", respectively. The IP address "IPpr" and the MAC address "Mpr" are examples of "target IP address" and "target identification information", respectively. The PING signal of T50 and the response signal of T52 in FIG. 4 are examples of "specific signal" and "response signal", respectively. The information indicating risk and the information indicating safety are examples of "first information" and "second information", respectively. The process of S72 in FIG. 3 is an example of "security process". The operation of selecting the device name "Dpr" in S22 of FIG. 2 is an example of "the instruction being for registering information related to the target device in the communication device".

The process of S12 in FIG. 2, the process of S50, the process of S60, the process of S62, the process of S64, the process of S66, the process of S72 in FIG. 3 are examples of "receive a target IP address (and receiving target identification information)", "determine whether the target IP address is the global IP address", "send a request signal", "determine whether a confirmation signal is received", "send a polling signal", "determine whether first information is received from the server via the Internet", and "execute a security process" in "communication device", respectively. Moreover, the process of S100, the process of S104, the process of S110, the process of S112 and the process of S120 in FIG. 4 are examples of "receive a request signal", "send a specific signal", "determine whether a response signal including the target IP address as a source IP address is received", "determine whether source identification information included in the response signal matches the target identification information in the request signal", and "send specific information" in "server", respectively.

Second Embodiment

Next, a second embodiment will be described. In the first embodiment, the determination whether the MAC addresses match each other is executed by the confirmation server 100 (S112 of FIG. 4), however, in the present embodiment, the determination is executed by the terminal device 10.

(Confirmation Server Process; FIG. 4)

In the case of determining YES in S110 of FIG. 4, the CPU 122 of the confirmation server 100 proceeds to S120 without executing the determination of S112. In S120, the CPU 122 sends, to the terminal device 10, information indicating risk that includes a MAC address (called "specific MAC address" below) matching the source MAC address included in the response signal.

(Security Determination Process; FIG. 3)

In S60 of FIG. 3, the CPU 22 of the terminal device 10 sends, to the confirmation server 100, a request signal that includes the IP address "IPpr" of the printer 50 and does not include the MAC address "Mpr". Moreover, in the case of determining YES in S66, the CPU 22 determines in S70 whether the MAC address "Mpr" of the printer 50 matches the specific MAC address included in the information indicating risk. The CPU 22 proceeds to S72 in a case of determining that the MAC address "Mpr" matches the specific MAC address (YES in S70), whereas the CPU 22 skips S72 and ends the process of FIG. 3 in a case of determining that the MAC address "Mpr" does not match the specific MAC address (NO in S70).

Figure 6:
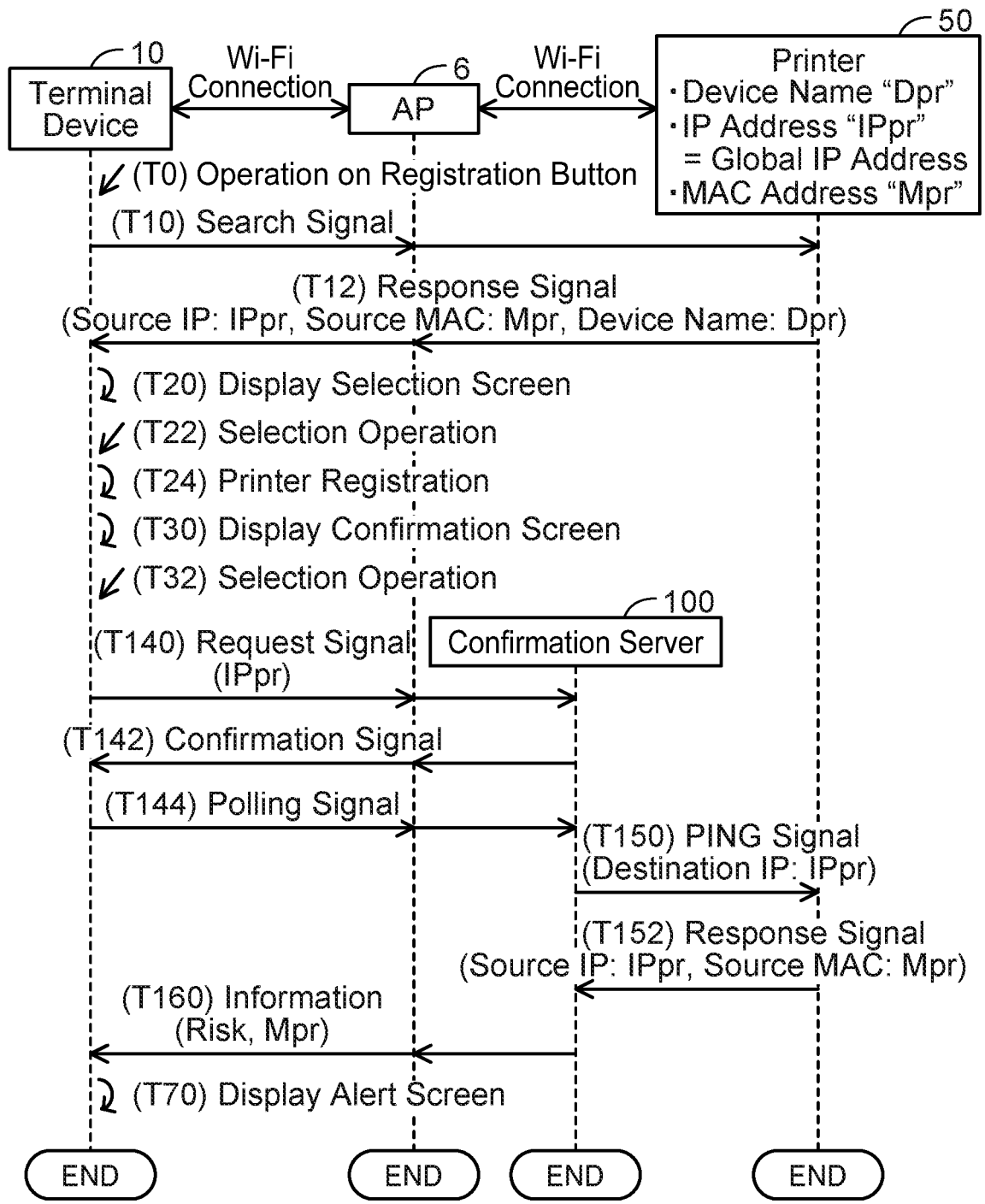
FIG. 6 shows a sequence diagram of a second embodiment.

(Specific Case; FIG. 6)

Next, a specific case realized by the present embodiment will be described with reference to FIG. 6. A state of the printer 50 is the same as the state of the printer 50 of FIG. 5.

T0 to T32 are the same as those of FIG. 4. In a case where the operation of selecting the YES button in the confirmation screen is accepted in T32 (YES in S54 of FIG. 3), the terminal device 10 sends a request signal that includes the IP address "IPpr" and does not include the MAC address "Mpr" to the confirmation server 100 in T140 (S60 of FIG. 3). T142 to T152 are the same as T42 to T52 of FIG. 5.

In T160, the terminal device 10 receives, from the confirmation server 100, information indicating risk including a specific MAC address (i.e., the source MAC address "Mpr" included in the response signal of T152) (YES in S66 of FIG. 3). Then, the terminal device 10 determines that the MAC address "Mpr" of the printer 50 matches the specific MAC address "Mpr" (YES in S70) and displays the alert screen (S130).

(Correspondence Relationships)

The specific MAC address is an example of "specific identification information". The process of S70 in FIG. 3 is an example of "determine whether the specific identification information included in the first information matches the target identification information" in "communication device".

Third Embodiment

FIG. 7

Figure 7:
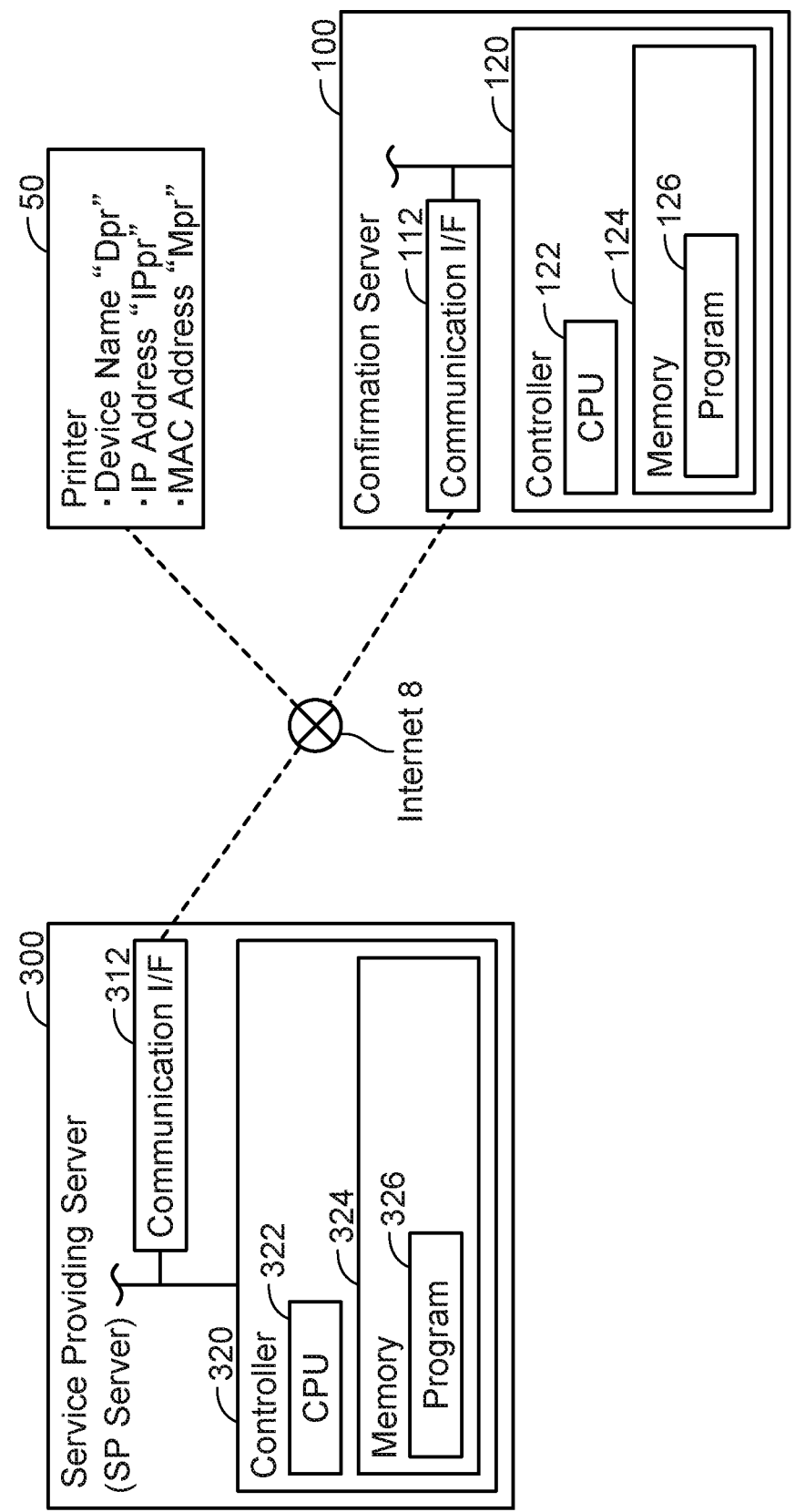
FIG. 7 shows a configuration of a communication system of a third embodiment.

Next, a third embodiment will be described. As shown in FIG. 7, in the present embodiment, a service providing server (called "SP server" below) 300 is used instead of the terminal device 10. The SP server 300 is configured to execute provision of a service to the printer 50. The service includes, for example, a service of receiving information indicating a remaining amount of a consumable article from the printer 50 and shipping a new consumable article to the user of the printer 50 in a case where the remaining amount of the consumable article is equal to or below a predetermined value.

The SP server 300 comprises a communication I/F 312 and a controller 320. The communication I/F 312 is connected to the Internet 8. The controller 320 comprises a CPU 322 and a memory 324. The memory 324 is constituted of a volatile memory, a non-volatile memory, and the like. The CPU 322 is configured to execute various processes in accordance with a program 326 stored in the memory 324.

Figure 8:
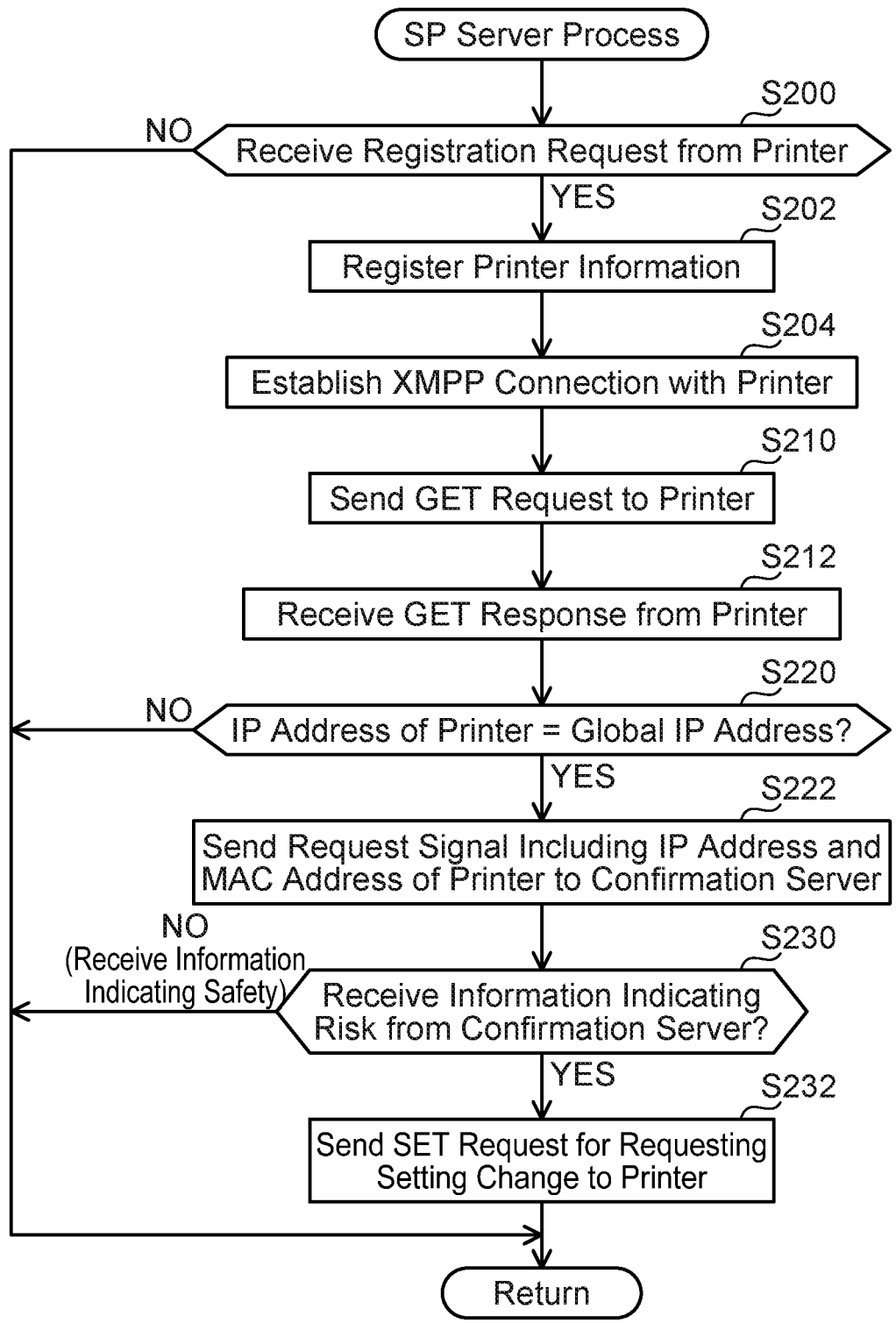
FIG. 8 shows a flowchart of an SP server process.

(SP Server Process; FIG. 8)

A process executed by the CPU 322 of the SP server 300 in accordance with the program 326 will be described with reference to FIG. 8.

In S200, the CPU 322 monitors whether a registration request is received from the printer 50 via the Internet 8 by using the communication I/F 312. The registration request is a signal requesting registration of information (called "printer information" below) for receiving provision of the service from the SP server 300. In a case of receiving the registration request from the printer 50 (YES in S200), the CPU 322 proceeds to S202.

In S202, the CPU 322 stores (i.e., registers) the printer information in the memory 324. The printer information includes, for example, the device name "Dpr" of the printer 50, a part number of consumable article used in the printer 50, authentication information (e.g., a token), information on a shipping destination of the consumable article (i.e., user name and address), etc.

In S204, the CPU 322 establishes an XMPP (abbreviation of eXtensible Messaging and Presence Protocol) connection (i.e., a so-called constant connection) via the Internet 8 between the SP server 300 and the printer 50 by using the communication I/F 312. Thereby, even without receiving a signal from the printer 50, the SP server 300 can send a signal to the printer 50 across a firewall of a LAN to which the printer 50 belongs.

In S210, the CPU 322 uses the XMPP connection (i.e., uses the communication I/F 312) to send, to the printer 50 via the Internet 8, a GET request for requesting sending of the IP address "IPpr" and the MAC address "Mpr" of the printer 50.

In S212, the CPU 322 uses the XMPP connection (i.e., uses the communication I/F 312) to receive, from the printer 50 via the Internet 8, a GET response including the IP address "IPpr" and the MAC address "Mpr".

S220 is the same as S50 of FIG. 3. The CPU 322 proceeds to S222 in a case of determining that the IP address "IPpr" is a global IP address (YES in S220), whereas the CPU 322 skips the subsequent processes and returns to S200 in a case of determining that the IP address "IPpr" is not a global IP address (NO in S220).

In S222, the CPU 322 sends a request signal including the IP address "IPpr" and the MAC address "Mpr" to the confirmation server 100 via the Internet 8 by using the communication I/F 312. Thereby, the confirmation server 100 determines YES in S100 of FIG. 4 and executes the processes of S102 to S122.

In S230, the CPU 322 determines whether the information indicating risk has been received from the confirmation server 100 via the Internet 8 by using the communication I/F 312. The CPU 322 determines YES in S230 and proceeds to S232 in case of receiving the information indicating risk from the confirmation server 100, whereas the CPU 322 determines NO in S230, skips the process of S232 and returns to S200 in case of receiving the information indicating safety from the confirmation server 100.

In S232, the CPU 322 sends, to the printer 50 via the Internet 8 by using the XMPP connection (i.e., by using the communication I/F 312), a SET request requesting a change in the communication setting of the printer 50. The SET request is a signal requesting for a communication port for receiving a signal from the Internet 8 to be disabled. The communication port includes, for example, a port 80 corresponding to HTTP (abbreviation of Hyper Text Transfer Protocol), a port 443 corresponding to HTTPS (abbreviation of Hyper Text Transfer Protocol Secure), and a port 21 corresponding to FTP (abbreviation of File Transfer Protocol), etc. When S232 completes, the CPU 322 returns to S200.

Figure 9:
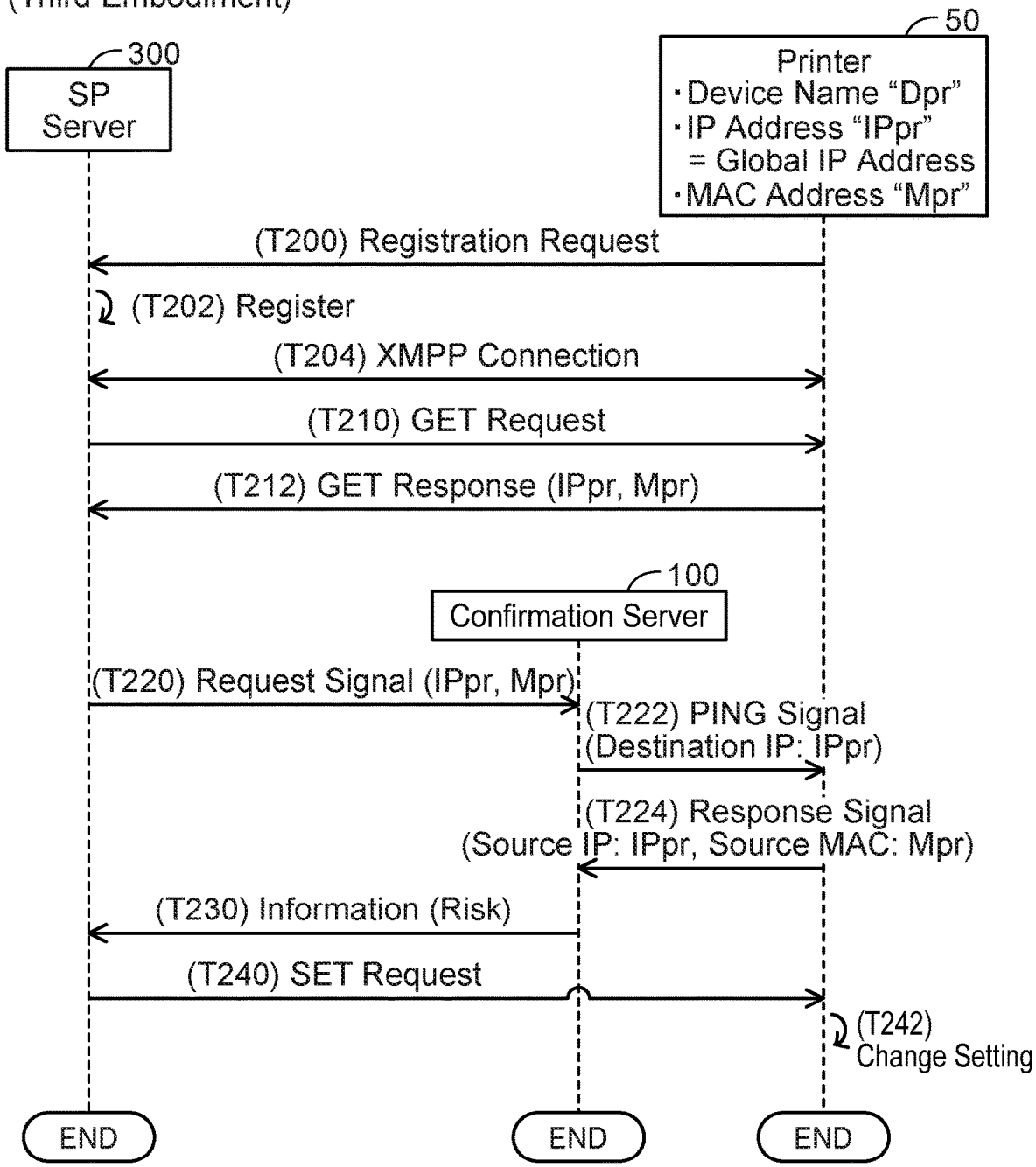
FIG. 9 shows a sequence diagram of the third embodiment.

(Specific Case; FIG. 9)

Next, a specific case realized by the present embodiment will be described with reference to FIG. 9. A state of the printer 50 is the same as the state of the printer 50 of FIG. 5.

Upon receiving a registration request from the printer 50 in T200 (YES in S200 of FIG. 8), the SP server 300 registers the printer information in T202 (S202) and establishes an XMPP connection with the printer 50 in T204 (S204).

Next, the SP server 300 sends a GET request to the printer 50 in T210 (S210) and receives a GET response including the IP address "IPpr" and the MAC address "Mpr" from the printer 50 in T212 (S212). In this case, the SP server 300 determines that the IP address "IPpr" is a global IP address (YES in S220) and sends a request signal including the IP address "IPpr" and the MAC address "Mpr" to the confirmation server 100 in T220 (S222).

T222 and T224 are the same as T50 and T52 of FIG. 5. The confirmation server 100 determines that the response signal has been received (YES in S110 of FIG. 4) and determines that the source MAC address "Mpr" included in the response signal matches the MAC address "Mpr" included in the request signal (YES in S112). In this case, in T230, the confirmation server 100 sends the information indicating risk to the SP server 300 (S120).

Upon receiving the information indicating risk from the confirmation server 100 in T230 (YES in S230), the SP server 300 sends a SET request to the printer 50 in T240 (S232). Thereby, in T242, the communication port of the printer 50 is disabled. Since the communication port for receiving a signal from the Internet 8 is disabled, it is possible to prevent the printer 50 from being accessed in an unauthorized manner via the Internet 8.

(Effect of Present Embodiment)

In the present embodiment as well, as in the first embodiment, each of the confirmation server 100 and the SP server 300 can determine whether there is the possibility of the printer 50 being accessed in an authorized manner via the Internet 8. Therefore, a mechanism for executing the determination does not have to be provided in the printer 50. Moreover, the SP server 300 sends the SET request to the printer 50 (T240) in the case of determining that the information indicating risk has been received from the confirmation server 100 (T230), that is, in the case of determining that there is the possibility of the printer 50 being accessed in an unauthorized manner via the Internet 8. Thereby, it is possible to prevent the printer 50 from being accessed in an unauthorized manner via the Internet 8.

(Correspondence Relationships)

The SP server 300 is an example of "communication device". The process of S212, the process of S220, the process of S222, the process of S230, and the process of S232 in FIG. 8, are examples of "receive a target IP address (receive target identification information)", "determine whether the target IP address is the global IP address", "send a request signal", "determine whether first information is received", and "execute a security process" in "communication device", respectively.

(Variant 1) In S72 of FIG. 3, the terminal device 10 may send a command instructing display of the alert screen to the printer 50, instead of displaying the alert screen. In another variant, the terminal device 10 may send an email indicating that there is the possibility of an unauthorized access to the printer 50, with a mail address of an administrator of the printer 50 as its destination. Moreover, in another variant, the terminal device 10 may send, to the printer 50, an instruction for disabling the communication port for receiving a signal from the Internet 8. All the variants are examples of "security process".

(Variant 2) In the case of NO in S110 or NO in S112 of FIG. 4, the confirmation server 100 may not send the information indicating safety to the terminal device 10 (i.e., may not execute S122). In this case, the terminal device 10 may determine NO in S66 in a case where the information indicating risk is not received even when a predetermined time has elapsed since the request signal was sent in S60 of FIG. 3. That is, "communication device" may not receive "second information".

(Variant 3) The terminal device 10 may not receive the IP address "IPpr" from the printer 50 via the AP 6. The terminal device 10 may use wired communication to receive the IP address "IPpr", or may use wireless communication of a BlueTooth (registered trademark) scheme, an NFC scheme, a TransferJet (registered trademark) scheme and the like to receive the IP address "IPpr".

(Variant 4) S62 and S64 of FIG. 3 may be omitted. In this case, the terminal device 10 may receive the information indicating risk or the information indicating safety as the response signal to the request signal. In the present variant, "determine whether a confirmation signal is received" and "send a polling signal" may be omitted.

(Variant 5) A timing when the security determination process of S40 in FIG. 2 (i.e., the process of FIG. 3) is executed is not limited to the timing when the information of the printer 50 is registered in the terminal device 10. For example, the security determination process may be executed at a timing when a predetermined operation is performed by the user after the information of the printer 50 has been registered. Moreover, for example, the app 28 may include a program for connecting the printer 50 to the AP 6, and in this case, the security determination process may be executed at a timing when the printer 50 is connected to the AP 6. The program may be a program for connecting to the AP 6 in accordance with a DPP (abbreviation of Device Provisioning Protocol) scheme to be formulated by the Wi-Fi Alliance. The DPP scheme is described in "DRAFT Device Provisioning Protocol Technical Specification Version 0.2.11", which is a draft of a standard prepared by the Wi-Fi Alliance.

(Variant 6) "Identification information" is not limited to the MAC address, and may be another type of identification information such as a device name, a serial number, etc.

(Variant 7) "Target device" is not limited to the printer 50, and includes various devices such as a scanner, a copy machine, a multi-functional device, a server, a PC, a smartphone, etc.

(Variant 8) "Communication device" is not limited to the terminal device 10 and the SP server 300, and may be a scanner, a printer, etc.

(Variant 9) In each of the above embodiments, the respective processes executed by the terminal device 10 and each of the servers 100, 300 are executed by software (that is, the app 28, the program 126 etc.). Instead of this, one or more of the processes may be implemented by hardware such as a logic circuit.

What is claimed is:

1. A non-transitory computer-readable medium storing computer-readable instructions for a communication device, the computer-readable instructions, when executed by a processor of the communication device, causing the communication device to:

receive a target IP address from a target device different from the communication device, the target IP address being an IP address of the target device;

after the target IP address which is a global IP address has been received from the target device, send a request signal including the target IP address to a server via the Internet, the request signal being for causing the server to send a specific signal via the Internet without receiving a signal from the target device, the specific signal including the target IP address as a destination IP address;

after the request signal has been sent to the server, determine whether first information is received from the server via the Internet, wherein the first information is received from the server in a case where the server receives a response signal including the target IP address as a source IP address in response to the server having sent the specific signal, and the first information is not received from the server in a case where the server does not receive the response signal in response to the server having sent the specific signal; and in a case where it is determined that the first information is received, execute a security process related to security of the target device, wherein in a case where it is determined that the first information is not received, the security process is not executed.

2. The non-transitory computer-readable medium as in claim 1, wherein the target IP address is received from the target device not via the Internet.

3. The non-transitory computer-readable medium as in claim 2, wherein the target IP address is received from the target device by using a local area network to which the communication device and the target device belong.

4. The non-transitory computer-readable medium as in claim 1, wherein it is determined that the first information is not received in a case where second information different from the first information is received from the server via the Internet after the request signal has been sent to the server.

5. The non-transitory computer-readable medium as in claim 1, wherein the computer-readable instructions, when executed by the processor, further cause the communication device to:

receive target identification information for identifying the target device from the target device, the request signal includes the target IP address and the target identification information, in a case where the server receives the response signal in response to the server having sent the specific signal and the server determines that source identification information included in the response signal matches the target identification information included in the request signal, the first information is received from the server, and in a case where the server receives the response signal in response to the server having sent the specific signal and the server determines that source identification information included in the response signal does not match the target identification information included in the request signal, the first information is not received from the server.

6. The non-transitory computer-readable medium as in claim 1, wherein
the first information includes specific identification information identical to source identification information included in the response signal,
the computer-readable instructions, when executed by the processor, further cause the communication device to:
receive target identification information for identifying the target device from the target device; and
in the case where it is determined that the first information is received, determine whether the specific identification information included in the first information matches the target identification information,
wherein in a case where it is determined that the first information is received and it is determined that the specific identification information matches the target identification information, the security process is executed, and
in a case where it is determined that the first information is received and it is determined that the specific identification information does not match the target identification information, the security process is not executed.

7. The non-transitory computer-readable medium as in claim 1, wherein
the computer-readable instructions, when executed by the processor, further cause the communication device to:
after the target IP address has been received from the target device, determine whether the target IP address is the global IP address,
wherein in a case where it is determined that the target IP address is the global IP address, the request signal is sent to the server, and
in a case where it is determined that the target IP address is not the global IP address, the request signal is not sent.

8. The non-transitory computer-readable medium as in claim 1, wherein
the computer-readable instructions, when executed by the processor, further cause the communication device to:
after the request signal has been sent to the server, determine whether a confirmation signal is received from the server via the Internet, the confirmation signal indicating that the server has received the request signal; and
in a case where it is determined that the confirmation signal is received from the server, send a polling signal to the server via the Internet, wherein in a case where it is determined that the confirmation signal is not received from the server, the polling signal is not sent,
wherein the first information is received from the server as a response to the polling signal in the case where the server receives the response signal in response to the server having sent the specific signal, and
in the case where it is determined that the confirmation signal is not received from the server, the security process is not executed.

9. The non-transitory computer-readable medium as in claim 1, wherein
after the target IP address which is the global IP address has been received from the target device and an instruction has been provided from a user, the request signal is sent to the server, the instruction being for registering information related to the target device in the communication device.

10. A communication device comprising:
a processor; and
a memory storing computer-readable instructions therein, the computer-readable instructions, when executed by the processor, causing the communication device to:
receive a target IP address from a target device different from the communication device, the target IP address being an IP address of the target device;
after the target IP address which is a global IP address has been received from the target device, send a request signal including the target IP address to a server via the Internet, the request signal being for causing the server to send a specific signal via the Internet without receiving a signal from the target device, the specific signal including the target IP address as a destination IP address;
after the request signal has been sent to the server, determine whether first information is received from the server via the Internet,
wherein the first information is received from the server in a case where the server receives a response signal including the target IP address as a source IP address in response to the server having sent the specific signal, and
the first information is not received from the server in a case where the server does not receive the response signal in response to the server having sent the specific signal; and
in a case where it is determined that the first information is received, execute a security process related to security of the target device, wherein in a case where it is determined that the first information is not received, the security process is not executed.

11. The communication device as in claim 10, wherein
the target IP address is received from the target device not via the Internet.

12. The communication device as in claim 11, wherein
the target IP address is received from the target device by using a local area network to which the communication device and the target device belong.

13. The communication device as in claim 10, wherein
it is determined that the first information is not received in a case where second information different from the first information is received from the server via the Internet after the request signal has been sent to the server.

14. The communication device as in claim 10, wherein
the computer-readable instructions, when executed by the processor, further cause the communication device to:
receive target identification information for identifying the target device from the target device,
the request signal includes the target IP address and the target identification information,
in a case where the server receives the response signal in response to the server having sent the specific signal and the server determines that source identification information included in the response signal matches the target identification information included in the request signal, the first information is received from the server, and
in a case where the server receives the response signal in response to the server having sent the specific signal and the server determines that source identification information included in the response signal does not match the target identification information included in the request signal, the first information is not received from the server.

15. The communication device as in claim 10, wherein
the first information includes specific identification information identical to source identification information included in the response signal,
the computer-readable instructions, when executed by the processor, further cause the communication device to:
receive target identification information for identifying the target device from the target device; and
in the case where it is determined that the first information is received, determine whether the specific identification information included in the first information matches the target identification information,
wherein in a case where it is determined that the first information is received and it is determined that the specific identification information matches the target identification information, the security process is executed, and
in a case where it is determined that the first information is received and it is determined that the specific identification information does not match the target identification information, the security process is not executed.

16. The communication device as in claim 10, wherein
the computer-readable instructions, when executed by the processor, further cause the communication device to:
after the target IP address has been received from the target device, determine whether the target IP address is the global IP address,
wherein in a case where it is determined that the target IP address is the global IP address, the request signal is sent to the server, and
in a case where it is determined that the target IP address is not the global IP address, the request signal is not sent.

17. The communication device as in claim 10, wherein
the computer-readable instructions, when executed by the processor, further cause the communication device to:
after the request signal has been sent to the server, determine whether a confirmation signal is received from the server via the Internet, the confirmation signal indicating that the server has received the request signal; and
in a case where it is determined that the confirmation signal is received from the server, send a polling signal to the server via the Internet, wherein in a case where it is determined that the confirmation signal is not received from the server, the polling signal is not sent,
wherein the first information is received from the server as a response to the polling signal in the case where the server receives the response signal in response to the server having sent the specific signal, and
in the case where it is determined that the confirmation signal is not received from the server, the security process is not executed.

18. The communication device as in claim 10, wherein
after the target IP address which is the global IP address has been received from the target device and an instruction has been provided from a user, the request signal is sent to the server, the instruction being for registering information related to the target device in the communication device.

19. A method executed by a communication device, the method comprising:

receiving a target IP address from a target device different from the communication device, the target IP address being an IP address of the target device;
after the target IP address which is a global IP address has been received from the target device, sending a request signal including the target IP address to a server via the Internet, the request signal being for causing the server to send a specific signal via the Internet without receiving a signal from the target device, the specific signal including the target IP address as a destination IP address;
after the request signal has been sent to the server, determining whether first information is received from the server via the Internet,
wherein the first information is received from the server in a case where the server receives a response signal including the target IP address as a source IP address in response to the server having sent the specific signal, and
the first information is not received from the server in a case where the server does not receive the response signal in response to the server having sent the specific signal; and
in a case where it is determined that the first information is received, executing a security process related to security of the target device, wherein in a case where it is determined that the first information is not received, the security process is not executed.

20. A non-transitory computer-readable medium storing computer-readable instructions for a server,
the computer-readable instructions, when executed by a processor of the server, causing the server to:
receive a request signal from a communication device via the Internet, the request signal including a target IP address which is an IP address of a target device different from the communication device and target identification information for identifying the target device;
in a case where the request signal is received from the communication device, send a specific signal via the Internet without receiving a signal from the target device, the specific signal including the target IP address as a destination IP address;
determine whether a response signal including the target IP address as a source IP address is received in response to sending the specific signal;
in a case where it is determined that the response signal is received, determine whether source identification information included in the response signal matches the target identification information in the request signal; and
in a case where it is determined that the response signal is received and it is determined that the source identification information matches the target identification information, send specific information to the communication device via the Internet, the specific information being for causing the communication device to execute a security process related to security of the target device, wherein in a case where it is determined that the response signal is not received, the specific information is not sent, and in a case where it is determined that the source identification information does not match the target identification information, the specific information is not sent.

* * * * *